US008988055B2

(12) United States Patent
Buthker et al.

(10) Patent No.: US 8,988,055 B2
(45) Date of Patent: Mar. 24, 2015

(54) DIGITAL WINDOWING CURRENT-MODE CONTROLLER FOR A DC-DC CONVERTER

(75) Inventors: Henricus C. J. Buthker, Mierlo (NL); Lambert J. H. Folmer, Overasselt (NL); Cornelis Stienstra, Malden (NL)

(73) Assignee: STMicroelectronics International N.V., Amsterdam (NL)

( * ) Notice: Subject to any disclaimer, the term of this patent is extended or adjusted under 35 U.S.C. 154(b) by 2200 days.

(21) Appl. No.: 11/573,352

(22) PCT Filed: Jul. 27, 2005
(Under 37 CFR 1.47)

(86) PCT No.: PCT/IB2005/052520
§ 371 (c)(1),
(2), (4) Date: Apr. 4, 2011

(87) PCT Pub. No.: WO2006/018755
PCT Pub. Date: Feb. 23, 2006

(65) Prior Publication Data
US 2011/0204868 A1 Aug. 25, 2011

(30) Foreign Application Priority Data
Aug. 13, 2004 (EP) .................................. 04103911

(51) Int. Cl.
*H02M 3/157* (2006.01)
*H02M 3/156* (2006.01)

(52) U.S. Cl.
CPC .................................... *H02M 3/156* (2013.01)
USPC ............................ 323/283; 323/282; 323/284

(58) Field of Classification Search
USPC ........................................ 323/282–285, 351
See application file for complete search history.

(56) References Cited

U.S. PATENT DOCUMENTS 4,761,725 A * 8/1988 Henze ............................... 363/46

6,304,066 B1 10/2001 Wilcox et al.
(Continued)

FOREIGN PATENT DOCUMENTS

JP 09-121536 A 5/1997
JP 11-178329 A 7/1999
(Continued)

OTHER PUBLICATIONS

International Search Report dated Mar. 27, 2006 in connection with PCT Patent Application No. PCT/IB2005/052520.
(Continued)

*Primary Examiner* — Jessica Han
*Assistant Examiner* — Gustavo Rosario Benitez
(74) *Attorney, Agent, or Firm* — Gardere Wynne Sewell LLP (57) ABSTRACT

A current-mode controlled power converter (1) comprises a controllable switch (S3) which is coupled to an inductor (L1) to obtain a periodical current (I1) through the inductor (L1). A current feedback loop (2, 3, 4, 5) generates a current-error signal (CE) which is a difference between a set current level (SC) and a level of a sensed current (SE) in the power converter (1). A driver (9) for switches off the controllable switch (S3) when the current error signal (CE) indicates that the level of the sensed current (SE) has reached the set current level (SC). A voltage feedback loop (10, 3, 7, 8, 5) influences the set current level (SC) in response to a level of an output voltage (Vout) of the power converter (1). The voltage feedback loop (10, 3, 7, 8, 5) comprises: a window circuit (10) to detect whether the output voltage (Vout) is (i) within a first window (WS) around a nominal value (Vr), (ii) outside the first window (WS) but within a second window (WL), larger than the first window (WS), (iii) outside the second window (WL). A controller (3) is coupled to the window circuit (10) to determine an adaptation of the set current level (SC), wherein the adaptation is larger when the output voltage (Vout) detected is outside the second window (WL) than when the output voltage (Vout) detected is within the second window (WL) but outside the first window (WS).

22 Claims, 6 Drawing Sheets

(56) References Cited

U.S. PATENT DOCUMENTS

| | | | |
|---|---|---|---|
| 6,373,334 B1* | 4/2002 | Melanson | 330/10 |
| 7,154,248 B2* | 12/2006 | Velhner et al. | 322/24 |
| 2002/0039018 A1 | 4/2002 | Sanzo et al. | |
| 2003/0173941 A1 | 9/2003 | Harris et al. | |
| 2003/0178974 A1* | 9/2003 | Rozsypal | 323/224 |
| 2004/0189266 A1* | 9/2004 | Miura et al. | 323/271 |
| 2006/0033483 A1* | 2/2006 | Wu | 323/282 |
| 2008/0252277 A1* | 10/2008 | Sase et al. | 323/283 |

FOREIGN PATENT DOCUMENTS

| | | |
|---|---|---|
| JP | 2003-070242 A | 3/2003 |
| WO | WO 03103119 A1 * | 12/2003 |

OTHER PUBLICATIONS

Written Opinion of the International Searching Authority dated Feb. 13, 2007 in connection with PCT Patent Application No. PCT/IB2005/052520.

* cited by examiner

DIGITAL WINDOWING CURRENT-MODE CONTROLLER FOR A DC-DC CONVERTER

CROSS-REFERENCE TO RELATED APPLICATION(S)

The present application claims priority under 35 U.S.C. §365 to International Patent Application No. PCT/IB2005/052520 filed Jul. 27, 2005, entitled "DIGITALLY CONTROLLING A DC-DC CONVERTER". International Patent Application No. PCT/IB2005/052520 claims under 35 U.S.C. §365 and/or 35 U.S.C. 119(a) to European Patent Application No. 04103911.6 filed Aug. 13, 2004, and which are incorporated herein by reference into the present disclosure as if fully set forth herein.

The invention relates to a current-mode controlled power converter comprising a window circuit and a controller, a portable electronic apparatus comprising the current-mode controlled power converter, and an integrated circuit comprising the window circuit and the controller.

US 2002/0144163 A1 discloses a system and a method for controlling a power converter. A controller, such as a digital signal processor or microprocessor, receives digital information from a plurality of power conversion blocks and transmits control commands in response to the information. In one embodiment, the controller operates the system in the well known current mode control and implements the generally known adaptive slope compensation.

The controller comprises a window comparator, and an analog to digital converter which converts the analog output voltage of the power converter into digital values. The analog to digital converter communicates to the controller a digital difference between a set voltage and the sensed voltage, and the window comparator communicates to the controller whether the input voltage is varied from the set voltage to indicate a high or low sensed voltage. The controller determines if the voltage supplied to the load is within an acceptable range, and if not, transmits a command to the power IC to adjust the set voltage.

The controller may operate in a PWM mode wherein a small fraction of the current of the source which supplies the source voltage is compared with a reference. At a threshold level a current limiter effectively turns a "high side" driver off. A further analog to digital converter is required to convert the sensed current to the digital domain.

The controller may comprise a PI compensator controller. The P action has the effect of reducing the rise time and improving stability, the I action has the effect of eliminating the steady state error. The PI compensator is unable to respond immediately to a load step. The output of the PI compensator is substantially instantaneously shifted by an amount proportional to a change in the sensed load current. The PI compensator resumes its action when the load current achieves the new compensated value.

It is an object of the invention to provide a digital controller with an improved regulation behavior.

A first aspect of the invention provides a current-mode controlled power converter. A second aspect of the invention provides a portable electronic apparatus. A third aspect of the invention provides an integrated circuit. Advantageous embodiments are defined in the dependent claims.

The current-mode controlled power converter in accordance with the first aspect of the invention comprises a current feedback loop for generating a current-error signal being a difference between a set current level and a level of a sensed current in said power converter. A driver switches off a controllable switch when the current error signal indicates that the level of the sensed current has reached the set current level. A voltage feedback loop influences the level of the set current in response to a level of an output voltage of the power converter. Such a current feed back loop, driver and voltage feedback loop are generally used in known current-mode controlled power converters.

The voltage feedback loop comprises a window circuit which detects whether the output voltage is (i) within a first window around a nominal value, (ii) outside the first window but within a second window, larger than the first window, or (iii) outside the second window. The second window is larger than the first window in that the differences between the levels of the second window and the nominal value of the output voltage is larger than the differences between the levels of the first window and the nominal value of the output voltage. Thus, in fact five window areas exist: within the first window, above the high level of the first window but within the second window, below the low level of the first window but within the second window, above the high level of the second window, or below the low level of the second window.

A controller is coupled to the window circuit to determine an adaptation of the set current level. This adaptation is larger when the detected output voltage is outside the second window than when the detected output voltage is within the second window but outside the first window. Thus, the amount of change of the set current depends on in which window the actual level of the output voltage is. If the difference between the actual level of the output voltage and its nominal value is relatively large, the amount of change of the set current to correct for this deviation will be relatively large. Consequently, the control behavior of the power converter is improved to better cater for large deviations from the nominal situation.

The power converter may be an up-converter or a down-converter. In both cases, the same controlling action can be used. This has the advantage that the same circuit can be used for different topologies of power converters.

In an embodiment, the window circuit comprises four comparators which compare the output voltage with four different reference levels. Two of the reference levels have different values higher than the nominal level, the two other reference levels have different values lower than the nominal level. The nominal level is the level of the output voltage occurring when the power converter is in a stabilized state wherein the output voltage has the desired value within the first window. Preferably, the levels are selected symmetrically around the nominal level. Instead of an expensive ADC only four comparators are required.

In an embodiment, the controller comprises a PI regulator with a proportional part and an integrating part which both are; larger outside the second window than inside the second window but outside the first window. The proportional action reduces the rise time and improves the stability; the integrating action eliminates the steady state error. Again, due to the larger proportional and integrating action outside the second window, the current level is adapted faster if the output voltage deviates more from the nominal value.

In an embodiment, when the output voltage level changes from within the first window to outside the first window but within the second window, the controller first increases the proportional part and the integrating part to a first level, and at a later instant, if the output voltage level is still outside the first window but within the second window, the integrating part to a second level higher than the first level. This has the advantage that the static resolution of the circuit is increased without deteriorating the speed of the system.

In an embodiment, the fractional behavior of the integrating part during a single switching period improves the resolution.

In an embodiment, the integrating action has three possible values; the static resolution of the circuit is further improved without deteriorating the speed of the system.

In an embodiment, due to the digital to analog converter, the comparator which compares the sensed current with the set current level is an analog circuit. A further expensive analog to digital converter which would have to convert the analog sensed current to a digital sensed current is not required. Such an analog to digital converter is expensive due to the high speed and accuracy required.

In an embodiment, the slope compensation, which as such is known, has been added to prevent oscillatory control behavior when the duty cycle is larger than ½.

In an embodiment, the averaging allows the use of a digital to analog converter with a relatively low resolution to minimize the on-chip area. The average level will become sufficiently accurate due to the averaging over several switching periods of the power converter.

In an embodiment, the slope compensation is performed with a parabola waveform. With this optimal slope compensation, a substantially dead-beat behavior is reached for sub harmonic oscillations in the current.

In an embodiment, the power converter can be easily switched from pulse width mode to pulse frequency mode. The burst mode, which generally occurs in current-mode controlled power converters, is prevented. The disadvantage of the burst mode is that the ripple on the output voltage is quite large.

In an embodiment, a hysteresis is obtained which prevents the power converter to switch continuously between pulse width mode and pulse frequency mode if the load current changes only marginally.

The power supply in accordance with the present invention can be implemented, for example, in portable electronic equipment, such as, for example, mobile phones, personal digital assistants, portable MP3, CD or DVD players, or GPS systems. Another example of a possible use of the power supply is an automotive DC-DC converter applications.

These and other aspects of the invention are apparent from and will be elucidated with reference to the embodiments described hereinafter.

Figure 1:
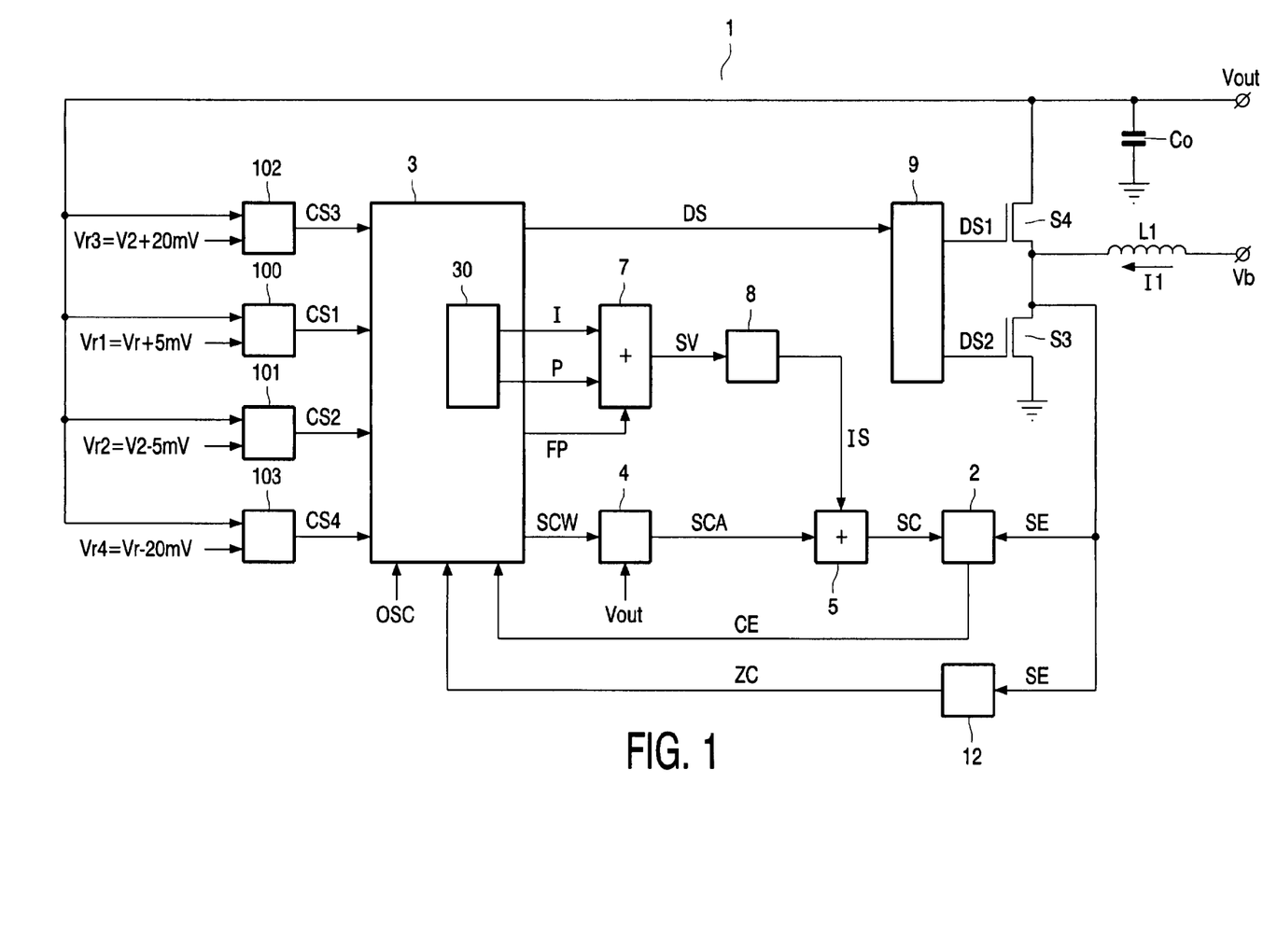
FIG. 1 shows a schematic block diagram of an embodiment of the current-mode controlled power converter.

FIG. 1 shows a schematic block diagram of an embodiment of the current-mode controlled power converter. By way of example only, the current-mode controlled power converter 1, further also referred to as the power converter 1, is shown to be an up-converter. The up-converter comprises a series arrangement of the main current paths of two switches S3 and S4. The series arrangement is arranged between a reference potential (which, by way of example is shown to be ground) and the output of the power converter 1 at which the output voltage Vout is supplied. By way of example, the switches S3 and S4 are shown to be FET's, of course other semiconductor switches such as bipolar transistors may be used. A driver 9 receives a drive signal DS from a controller 3 to supply the drive signals DS1 and DS2 to the gates of the FET's S3 and S4, respectively. An inductor L1 is arranged between the input voltage Vb and the junction of the main current paths of the switches S3 and S4. The current through the inductor L1 is denoted by I1. The inductor L1 may be a coil or a transformer.

The controller 3 supplies the drive signal DS to the driver 9 to determine the on- and off-periods of the switches S3 and S4. If the switch S3 is closed while the switch S4 is open, the current I1 rises substantially sawtooth like. If the switch S4 is closed and the switch S3 is open, the current I1 build up in the inductor L1 is supplied to a load (not shown) connected to receive the output voltage Vout.

The current-mode controlled power converter 1 comprises a current control loop which as such is well known. An oscillator (not shown) which provides a oscillator signal OSC with a fixed repetition frequency to the controller 3, to determine start instants of the switching cycles of the power converter 1 at which the switch S3 is switched on and the switch S4 is switched off. The current in the inductor L1 starts ramping up. The current control loop compares a sensed current level SE in the power converter 1 with a set current level SC as well known to those of skill in the art, such as by the comparator 2, generating a current exceeded indication CE to the controller 3. The switch S3 is opened and the switch S4 closed at the instant the sensed current level SE reaches the set current level Sc. Now, the current I1 starts ramping down while it is supplied to the load. The sensed current level SE is indicative for the current I1 through the inductor L1. This current I1 may be sensed with a well-known current sensor (not shown) in series with the inductor L1. It is also possible to sense the current I1as a voltage across a resistance in series with one of the switches S3 or S4, or, as shown, as a voltage across the switch S3 if this switch has an intrinsic resistance. It is also possible to sense the voltage across the switch S4.

As is well known, to prevent oscillatory behavior of the current control loop (see FIGS. 2A and 2B), a slope compensation may be provided. Usually, the slope compensation is provided by generating a set current level SC which decreases sawtooth or parabola like in time during each switching period TC of the power converter 1. The slope compensation waveform SCW is generated by the controller 3 and fed to a digital to analog converter 4. The digital to analog converter 4 supplies the analog slope compensation signal SCA to a summing circuit 5. If adaptive slope compensation is desired, the digital to analog converter 4 comprises an input to receive the output voltage Vout and multiplies the digital slope compensation waveform SCW with the level of the output voltage Vout.

The power converter 1 further comprises a voltage control loop, which as such is well known. The voltage control loop controls the set current level SC dependent on the level of the output voltage Vout.

The voltage control loop in accordance with an embodiment of the invention comprises four comparators 100 to 103 which each have an input to receive the output voltage Vout of the power converter 1. The comparator 100 further receives a reference voltage Vr1 which has a level Vr+5 mV wherein Vr is a nominal value. The comparator 101 further receives a reference voltage Vr2 which has a level Vr−5 mV. The comparator 102 further receives a reference voltage Vr3 which has a level Vr+20 mV. The comparator 103 further receives a reference voltage Vr4 which has a level Vr−20 mV. These values of the reference voltages Vr1 to Vr4 are examples only. The nominal value Vr is the reference voltage corresponding with the desired, correct output voltage Vout.

The reference voltages Vr1 and Vr2 form a window around the nominal value Vr which is further referred to as the small window WS. The reference voltages Vr3 and Vr4 form a window around the nominal value Vr which is further referred to as the large window WL because it encompasses the small window WS. The windows WL and WS may also be generated in another manner than by using the four comparators 100 to 103. The comparators 100 to 103 supply the control signal CS1 to CS4, respectively, which indicate to the controller 3 what the actual value of the output voltage Vout is with respect to the reference voltages Vr1 to Vr3.

The controller 3 comprises a PI-regulator 30 which supplies a proportional part P and an integrating part I dependent on the control signals CS1 to CS4. The proportional part P has the effect of reducing the rise time and the steady state error, the integrating part I has the effect of eliminating the steady state error. Both the proportional part P and the integral part I have values which are larger when the output voltage Vout is outside the large window WL than when the output voltage Vout is inside the large window WL but outside the small window WS. This is further elucidated with respect to FIGS. 4A, 4B and 5. The output voltage Vout is outside the large window WL if its level is higher than the third reference voltage Vr3 or lower than the fourth reference voltage Vr4. The output voltage Vout is inside the large window WL but outside the small window WS if (i) its level is higher than the first reference voltage Vr1 but lower than the third reference voltage Vr3, or (ii) its level is lower than the second reference voltage Vr2 but higher than the fourth reference voltage Vr4.

The summing circuit 7 sums the proportional part P and the integrating part I to obtain a summed value SV. The digital to analog converter 8 converts the digital summed value SV to an analog value IS which determines the set current level SC in response to the level of the output voltage Vout. The summing circuit 5 sums the analog value IS to the average value SCA to obtain the set current level SC to which the sensed current level SE is compared in the current loop.

The summing circuit 7 further receives a fractional part FP from the controller 3. Since the system is digital, the resolution of the set current level SC is limited. For example, the resolution may be 25 mA per LSB of the digital to analog converter 8. The higher resolution is achieved by averaging the set current level SC between two values over a number of switching cycles TC, for example, the fraction may be 64 switching periods TC. For example, if a six bit digital to analog converter 8 is used, a sufficient accurate set current level SC may be reached if the set current level SC has two levels which are averaged over 64 switching periods TCE and in fact a 12 bit resolution is realized. Thus, with respect to the example given earlier, the fractional part FP may be a pulse which has a lower repetition rate than the switching cycle TC and of which the duration may vary between 1 and 64 switching cycles TC. This fractional part FP may also be used to convey the fractional part of the integrating part I and the proportional part P to the summing circuit 7. The summing circuit 7 may be part of the controller 3.

Figure 2A:
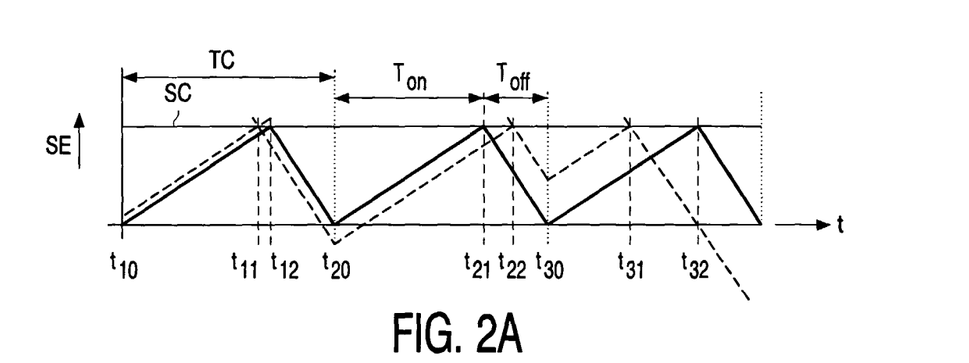
FIGS. 2A and 2B show basic waveforms occurring in the current-mode controlled power converter.
Figure 2B:
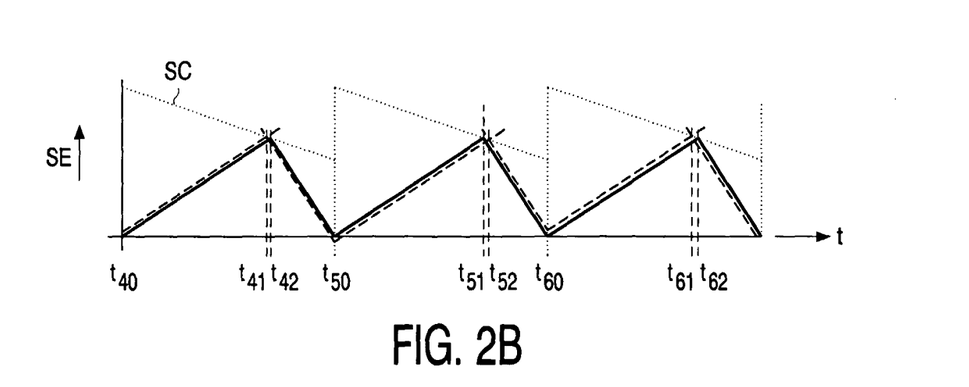

FIGS. 2A and 2B show basic waveforms occurring in the current-mode controlled power converter. Both FIG. 2A and FIG. 2B show, during three switching periods TC, the sensed current SE which is indicative for the current I1 through the inductor L1.

FIG. 2A shows the behavior of the current-mode controlled power converter 1, if the set current level SC is constant during the switching periods TC. The first switching period starts at the instant t10 and ends at the instant t20, the second switching period starts at the instant t20 and ends at the instant t30, the third switching period starts at the instant t30.

The non-dashed line shows the current I1 in a stable situation. In an up-converter, the rising part of the current I1 occurs during the on-period Ton when the switch S3 is closed and the switch S4 is open. The falling part of the current I1 occurs during the off-period when the switch S3 is open and the switch S4 is closed. The switch S3 is opened at the instants t12, t21, t32 when the sensed current SE reaches the set current level SC. The start instants t10, t20, t30 are determined by an oscillator.

The dashed line shows the sensed current SE caused by a small offset in the power converter 1. This small offset causes the sensed current SE to reach the set current level SC at the instants t11, t22, t31. As can be seen, this small offset causes an oscillatory behavior in the sensed current SE and thus of the current I1 through the inductor L1.

FIG. 2B shows the behavior of the current-mode controlled power converter 1, if the set current level SC varies with a sawtooth during the switching periods TC. This so-called slope compensation as such is well known. Instead of a sawtooth compensation, a parabola compensation may be used. The parabola compensation is even better than the sawtooth compensation because, if designed well, a dead-beat behavior is possible wherein the offset is compensated after one switching period TC of one switching cycle. Now, the first switching period starts at the instant t40 and ends at the instant t50, the second switching period starts at the instant t50 and ends at the instant t60, the third switching period starts at the instant t60. In the digital implementation, such an optimal parabola waveform can easily be generated and varied dependent on the application by inputting the correct coefficients via a bus. In analog controllers, usually external components have to be trimmed to the particular application.

The non-dashed line shows the current I1 in the same stable situation as shown in FIG. 2A. Again, the power converter 1 is an up-converter wherein now the switch S3 is opened at the instants t42, t51, t62 when the sensed current SE reaches the set current level SC. The dashed line shows the sensed current SE caused by a small offset in the power converter 1. This small offset causes the sensed current SE to reach the set current level SC at the instants t41, t52, t61. As can be seen, this small offset causes only very small differences between the instants t42, t51, t62 on the one hand and the instants t41, t52, t61 on the other hand. The oscillatory behavior in the sensed current SE shown in FIG. 2A is prevented.

Figure 3:
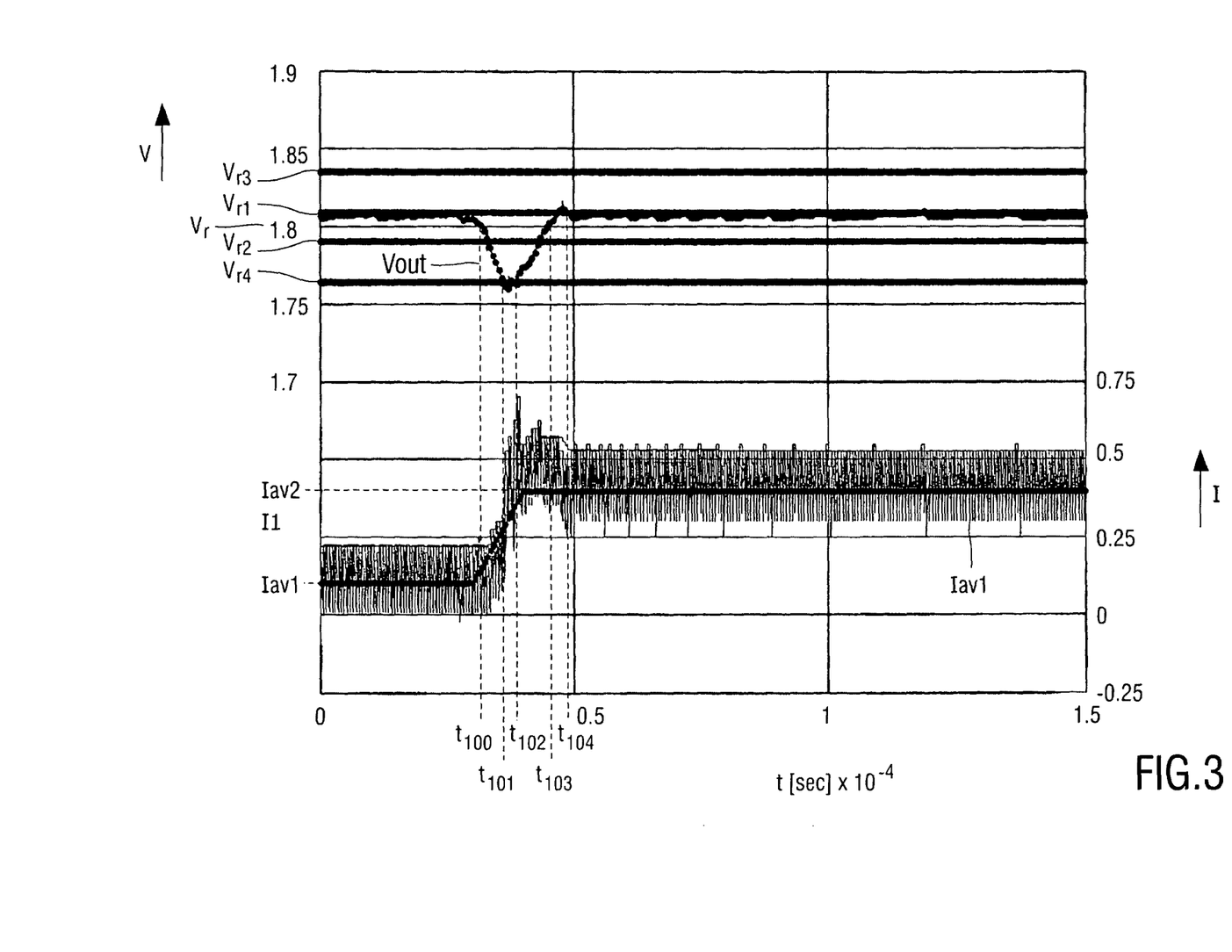
FIG. 3 shows waveforms of the output voltage and the current in the inductor if the two windows in accordance with the invention are used.

FIG. 3 shows waveforms of the output voltage and the current in the inductor if the two windows in accordance with the invention are used. The output voltage Vout and the reference levels Vr1 to Vr4 of the windows WL and WS around the nominal level Vr are shown in the top-part of FIG. 3. The current I1 through the inductor L1 and its average value Iav are shown in the bottom-part of FIG. 3. The voltages and currents shown along the vertical axis are examples only.

Before the instant t100, the output voltage Vout is stabilized within the small window WS, the sawtooth current I1 through the inductor L1 with the repetition frequency, which is the reciprocal of the switching period TC, has the average value Iav1. From the instant t100 onwards, the load requests an extra amount of current. Consequently, the level of the output voltage Vout starts decreasing.

As soon as the level of the output voltage Vout leaves the small window WS by dropping below the reference voltage Vr2 at the instant t100, the proportional part P and the integrating part I are increased with a predetermined first amount to increase the effect of their action. Due to the increase of the proportional part P and the integrating part I, the set current level SC is increased and thus the current I1 is allowed to rise to higher peak values.

As soon as the level of the output voltage Vout leaves the large window WL by dropping below the reference voltage Vr4 at the instant t101, the proportional part P and the integrating part I are further increased, causing a faster rise of the maximum amplitude of the current I1. Thus, the new situation is reached faster due to the two window design with a stronger P and I action outside the large window WL than within the large window WL but outside the small window WS. At the instant t102, the output voltage Vout reenters the large window WL and the proportional part P and the integrating part I are decreased to the predetermined first amount. At the instant t103, the output voltage Vout reenters the small window WS and the proportional part P and the integrating part I are further decreased to their starting values. At the instant t104, the stable situation is reached again wherein the output voltage Vout is stabilized to a level within the small window WS but now at the higher average current Iav2 requested by the load.

Figure 4A:
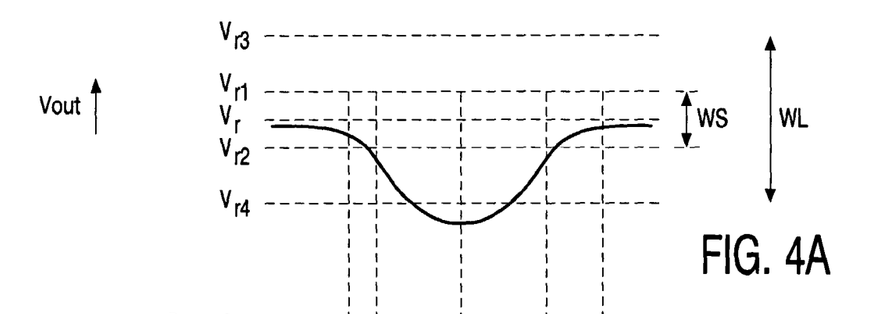
FIGS. 4A and 4B show an example for elucidating the different levels of the proportional part and the integrating part.
Figure 4B:
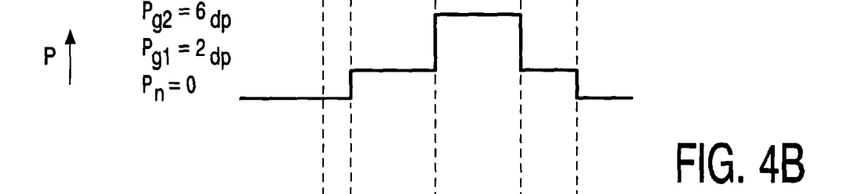
Figure 4C:
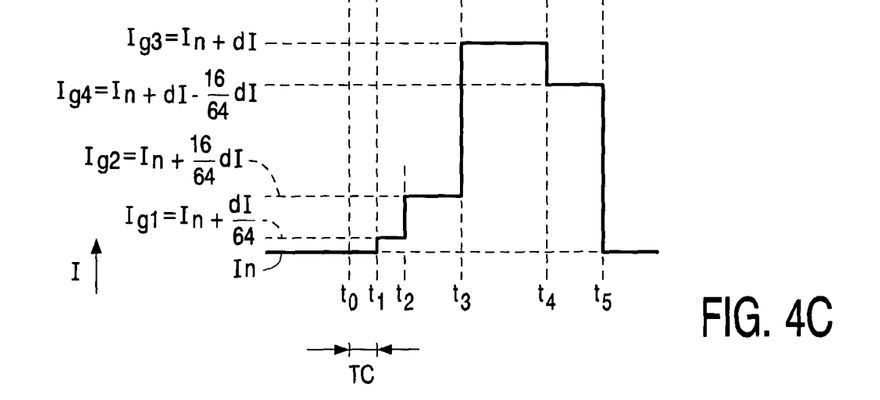

FIGS. 4A to 4C show an example for elucidating the different levels of the proportional part and the integrating part.

In FIG. 4A, the output voltage Vout, the small window WS, the large window WL, the nominal level Vr, and the reference levels Vr1 to Vr4 are shown. The nominal value of the output voltage Vout is represented by Vr, the small window WS is bordered by the reference levels Vr1 and Vr2. The large window WL is bordered by the reference levels Vr3 and Vr4.

In FIGS. 4B and 4C, the different levels of the proportional part P and the integrating part I are shown, respectively, for an example wherein until the instant t0 the output voltage Vout is within the small window WS. Within the small window WS, the proportional part P has a starting or nominal level Pn of zero, and the integrating part I has a predetermined starting or nominal value In. Somewhat later than the instant t0, the output voltage Vout drops below the low border Vr2 of the small window WS and enters the large window WL. During the switching cycle TC, lasting from the instant t0 to the instant t1, the entering into the large window WL is detected and in the subsequent switching cycle TC, lasting from the instant t1 to t2, the proportional part P is increased to the level Pg1 which has the value 2dP, wherein dP is a predetermined delta proportional part P. And, the integrating part I is increased to the level Ig1=In+dI/64, wherein dI is a predetermined delta integrating part I.

After a single switching cycle TC, at the instant t1, the output voltage Vout is still within the large window WL. Now, during the switching cycle TC lasting from the instant t2 to t3, the proportional part P is kept on the level Pg1, while the integrating part I is further increased to the level Ig2=In+dI/64+dI*16/64. The integrating part I may be kept on this value Ig2 as long as the output voltage V0 is outside the large window WL as is shown. But preferably, the integrating part I is increased every switching cycle TC with dI*16/64 until the maximal value In+1*dI is reached.

During the switching cycle TC preceding the instant t3, the output voltage Vout drops below the reference level Vr4 of the large window WL. Now the proportional part P is enlarged to the level Pg2=6dP, and the integrating part I is enlarged to the maximum value Ig3=In+dI.

During the switching cycle TC preceding the instant t4, the effect of the increased proportional part P and the increased integrating part I cause the output voltage Vout to rise above the reference level Vr4. In the switching cycle TC starting at the instant t4, the proportional part P decreases to the level Pg1, and the integral part decreases with the amount dI*16/64 to the level Ig4.

During the switching cycle TC following the instant t4, the output voltage Vout crosses the reference level Vr2 of the small window WS. The proportional part P changes to the level zero, and the integrating part decreases to the nominal level In. Although is shown that the integrating part I has a constant level Ig4 for the two switching cycles TC between the instants t4 and t5, the integrating part I may decrease with the amount dI*16/64 for every consecutive switching cycle wherein the output voltage Vout is within the large window WL but not within the small window WS.

Figure 5:
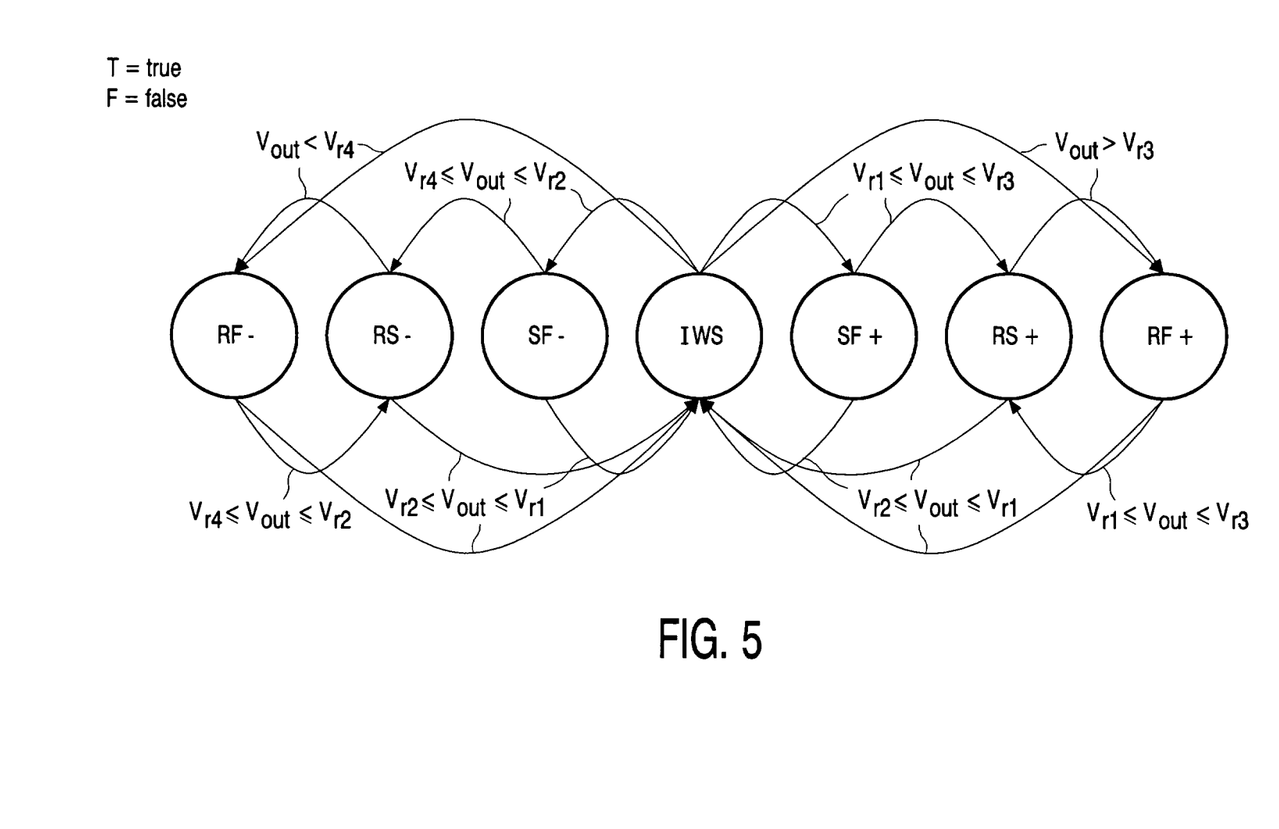
FIG. 5 shows a state diagram to elucidate the states of the controller dependent on the level of the output voltage, and FIGS. 6A an 6B show waveforms for elucidating the switch over from pulse width mode to pulse frequency mode.

FIG. 5 shows a state diagram to elucidate the states of the controller dependent on the level of the output voltage. In the states SF+ and SF− the proportional part P is constant, and the integrating part I is stepwise increased or decreased with the amount dI*16/64, respectively. However, preferably the states SF+ and SF− are kept only a single switching period TC. These actions performed in the states SF+ and SF− are also referred to as increasing the fraction and decreasing the fraction, respectively. In the states RS+ and RS−, the increase or decrease of the proportional part P with the relatively small proportional step of 2dP is also referred to as a slow ramp up or down, respectively. In the states RF+ and RF−, the increase or decrease of the proportional part P with the relatively large proportional step of 4dP to obtain 6dP and the concurrent enlargement of the integrating part I is also referred to as a fast ramp up or down, respectively.

The arrows indicate the state changes dependent on the value of the output voltage Vout with respect to the window level Vr1 to Vr4. The conditions near the arrows indicate that the transition will be performed if the condition is true. A state is not changed if all of the conditions of the arrows pointing away from the state are false, or if elucidated otherwise in the now following. The operation of the controller 3 which controls the states dependent on the control signal CS1 to CS4 generated by the comparators 100 to 103, is discussed only for output voltages Vout which are higher than the reference level Vr2. The transitions between the states for output voltages Vout below the lower level Vr2 of the small window WS are obtained in analogy with the discussed transitions above this level Vr2.

If the current-mode controlled power converter 1 is in the state IWS (the level of the output voltage Vout is within the small window WS it will stay in this state IWS. If the output voltage Vout increases to above the level Vr1 but stays below the level Vr3 (thus leaves the small window WS but stays within the large window WL), the power converter 1 changes to the state SF+.

In the state SF+, the proportional part P is not changed while the integrating part I is increased with a small integrating step (for example, dI/64). The power converter 1 stays in the state SF+ only a limited number of switching cycles TC. The limited number is preferably 1 to obtain an as fast a response as possible on a load step. If the output voltage Vout stays outside the small window WS but within the large window WL longer than the limited number of switching cycles TC, the state RS+ is entered. In the state RS+, as long as the output voltage Vout stays outside the small window WS but within the large window WL, the integrating part I may be increased with the predetermined small integrating step (for example dI*I/64) once, or every switching cycle TC until the maximum level is reached. The integrating part I may also increase with the predetermined small integrating step every fixed number of the switching cycles TC.

Alternatively, in the state SF+, the integrating part I may be increased with the predetermined small integrating step only.

In the state RS+, which is entered when the output voltage Vout is outside the small window WS but within the large window WL sufficiently long, the proportional part P is increased once with a predetermined small proportional step (for example, 2*dP). The integrating part I may be increased with a predetermined intermediate integrating step (for example dI*16/64) once, or every switching cycle TC until the maximum level is reached. The integrating part I may also increase with the predetermined intermediate integrating step every fixed number of the switching cycles TC.

Starting from the state RS+, when the output voltage Vout rises above the reference level Vr3, the state RF+ is entered. Now, the proportional part P is increased to a larger value than the predetermined small proportional step (for example, with 4dP to 6dP). The integrating part I is increased with a predetermined largest integrating step (for example dI). Preferably, the integrating part I is limited to a maximum value and is switched to this maximum value in one step.

Starting from either one of the states SF+ or RS+, as soon as the output voltage Vout drops to within the small window WS, the state IWS is entered again. Starting from the state RF+, when the output voltage Vout drops below the reference level Vr3, the state RS+ is entered.

Figures 6A, 6B:
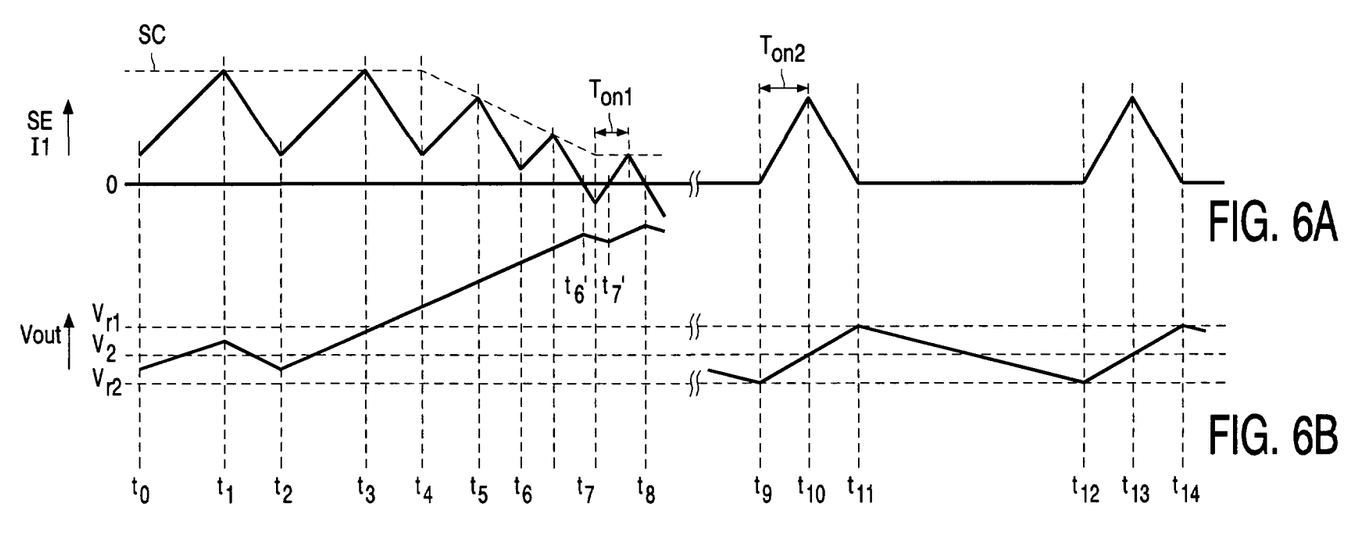

FIGS. 6A and 6B show waveforms for elucidating the switch-over from pulse width mode to pulse frequency mode. The instants t0 to t14 used in FIGS. 6A and 6B are not related to the instants t0 to t4 used in FIGS. 4A and 4B. FIG. 6A shows the set current level SC and the sensed current SE with represents the current I1 through the inductor L1. FIG. 6B shows the output voltage Vout and the references voltages Vr, Vr1 and Vr2. Now the operation of the power converter 1 is elucidated with respect to a down-converter. However, the present invention is not restricted to a down-converter and may be implemented in an up-converter too. Although the same references are used as shown in FIG. 1 which shows an up-converter topology, the arrangement of the switches S3, S4 and the inductor L1 is different in a down-converter. In a down-converter, the inductor L1 is arranged between the output at which the output voltage Vout is supplied and a junction to which both the switch S3 and S4 are coupled. The switch S4 is arranged between this junction and the input at which the input voltage Vb is present. The switch S3 is arranged between this junction and a reference potential which usually is ground.

At the instant t0 a switching cycle TC of the pulse width mode operated power converter 1 starts. The pulse width mode is further also referred to as PWM state. At the instant t0, the inductor L1 is arranged between the input of the power converter 1 and the load via the closed switch S4. The current I1 through the inductor L1 starts ramping up until the set current level SC is reached at the instant t1. During this up-ramping current I1 the current I1 is supplied to the load and thus the output voltage Vout increases. In fact this is a simplification because the output voltage Vout only rises if the actual current I1 in the inductor L1 is larger than the actual current drawn by the load. At the instant t1, the inductor L1 is connected between the output and ground via the closed switch S3 and the current I1 starts ramping down until at the instant t2, which is a predetermined period in time later than the instant t1, a next switching cycle is started. The predetermined period in time between t1 and t2 which is the switching period TC is determined by an oscillator. The switching period TC is also referred to as the switching cycle.

Shortly after the instant t2 and before the instants t3, the load of the power converter 1 sharply decreases. This may happen if the electronic apparatus which forms the load enters a sleep mode or standby mode. Now, the still up-ramping current I1 is much larger than the current drawn by the load and thus causes the output voltage Vout to sharply increase. At the instant t3 the current I1 starts ramping down. In fact, this ramping down current I1 still may be much larger than the current drawn by the load and the output voltage Vout may keep on rising during many switching cycles TC. It is assumed that the ramping up of the output voltage Vout stops at the instant t6' at which the current I1 becomes negative. Further, it is schematically indicated that the variation of the output voltage Vout gives rise to a linear change of the current set level SC, during the same switching cycle. But the response may also start from the start of the next switching cycle TC. In a practical application, due to the two windows WS and WL, the current set level SC will drop non-linear. The start of the decrease of the current set level SC may actually start somewhat earlier or later than shown.

The current I1 becomes negative at the instant t6' just before the instant t7 due to the decreasing current set level SC. When now is detected that the output voltage Vout was already dropped or drops below the reference level Vr3, the PWM state is changed into a pulse frequency mode, which is also referred to as the PFM state. In the PFM state the on-time Ton2 is selected to be larger than the on-time Ton1 occurring during the PWM state shortly before the change into the PFM state. The hysteresis obtained prevents a continuous switching between the PWM state and the PFM state. Preferably, the on-time Ton2 is selected to be twice the on-time Ton1 because this is easily possible in a clocked digital system. The output voltage Vout drops until the instant t7' at which the current I1 supplied to the load becomes larger than the current drawn by the load.

The operation in the PFM state is elucidated by the waveforms occurring after the instant t9 at which the output voltage Vout reaches the reference level Vr3. During the fixed on-time Ton2 which lasts from the instant t9 to the instant t10, the current I1 ramps up a fixed amount. At the instant t10 the off-period starts and the current I1 ramps down to zero. The current I1 stops at its zero value at instant t11 because the switch S3 is opened and inductor L1 is floating. The value of zero current I1 may be detected as well known in the art, such as by zero current detector 12, providing a ZC indication to the controller 3. The output voltage Vout starts increasing at the start of the on-period Ton2 and starts to decrease at the instant t11 when the inductor L1 does not anymore supply current to the load. At the instant t12, the output voltage Vout reaches the level Vr3 again and a next cycle starts which is identical to the cycle which started at the instant t9. At the instant t13 the on-time Ton2 ends, and the current I1 becomes zero again at the instant t14.

It has to be noted that the reference level Vr3 may be another reference level. The use of Vr3 is advantageously because the same comparator 101 with the same reference level Vr2 can be used and no adaptations are required.

It should be noted that the above-mentioned embodiments illustrate rather than limit the invention, and that those skilled in the art will be able to design many alternative embodiments without departing from the scope of the appended claims.

The skilled person will be able to understand how to change the configuration of the switches and the inductor to obtain an up-converter. The rest of the circuit needs no adaptations and operates in the same manner as the down-converter. Only, if adaptive slope compensation is desired, the digital to analog converter 4 should receive a voltage dependent on the output voltage V0 instead of the input voltage Vb.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A current-mode controlled power converter comprising:
   a controllable switch configured to be coupled to an inductor,
   a current feedback loop configured to generate a current-error signal determined by a difference between a set current level and a sensed current level of current in said inductor,
   a driver circuit configured to switch off the controllable switch when the current error signal indicates that the sensed current level has reached the set current level, and
   a voltage feedback loop configured to adjust the set current level in response to a level of an output voltage of the power converter, wherein the voltage feedback loop comprises:
      a window comparator circuit configured to compare the output voltage to a plurality of reference voltages defining windows and generate: a first indication if the output voltage is within a first window around a nominal level, a second indication if the output voltage is outside the first window but within a second window that is larger than the first window, and a third indication if the output voltage is outside the second window, and
      a controller operative responsive to the first, second and third indications to generate the set current level as a function of an adaptive value, wherein the adaptive value has first level in response to the first indication, a second level greater than the first level in response to the second indication and a third level greater than the second level in response to the third indication;
      wherein the controller comprises a PI regulator operative to output the adaptive value comprising a proportional part and an integrating part, and wherein the proportional part and the integrating part each include first, second and third levels, the set-current level being dependent on a combination of both the proportional part and the integrating part.

2. The converter of claim 1, wherein the window comparator circuit comprises:
   a first comparator operative to compare the output voltage with a first reference level,
   a second comparator operative to compare the output voltage with a second reference level,
   a third comparator operative to compare the output voltage with a third reference level,
   a fourth comparator operative to compare the output voltage with a fourth reference level,
   wherein the first reference level is higher than the nominal level,
   wherein the second reference level is lower than the nominal level,
   wherein the third reference level is higher than the first reference level,
   wherein the fourth reference level is lower than the second reference level,
   the first reference level and the second reference level forming the first window,
   the third reference level and the fourth reference level forming the second window.

3. The converter of claim 1, wherein third levels for each of the proportional part and the integrating part are at least 2 times larger than the second levels for the corresponding proportional and integrating parts.

4. The converter of claim 1, the controller is configured in response to the second indication to first increase, the integrating part to an initial second level and at a later instant, in the absence of the third indication to second increase the integrating part to another second level higher than the initial second level.

5. The converter of claim 4, wherein said initial second level is present during a single switching period of the power converter.

6. The converter of claim 4 wherein the second level for the integrating part has one value if the second indication immediately follows the first indication in time and has another value if the second indication immediately follows the third indication in time.

7. The converter of claim 1, further comprising:
   a first summing circuit operative to sum the proportional part and the integral part to obtain a summed value, and
   a first digital to analog converter operative to convert the summed value to an analog value being representative for the set current level.

8. The converter of claim 7, wherein said controller is further operative to generate a slope compensation waveform, further comprising:
   a second digital to analog converter operative to convert the slope compensation waveform to an analog slope compensation signal, and
   a second summing circuit operative to sum the analog value and the analog slope compensation signal to obtain the set current level.

9. The converter of claim 8, wherein the controller is further operative to supply a fractional part to the first summing circuit, the fractional part being a pulse with a lower repetition rate than the switching cycle.

10. The converter of claim 1, wherein the controller is operative to control the power converter in a pulse width mode, and wherein the power converter further comprises a zero-current detector operative to detect whether the inductor current becomes zero, and wherein the controller is further operative to change the pulse width mode to a pulse frequency mode if is detected that the inductor current becomes zero and the level of the output voltage drops below a lower level of the first window or the second window.

11. The converter of claim 10, wherein in the pulse width mode the converter operates with a first duty cycle of a switching cycle of the power converter, and wherein in the pulse frequency mode the controller is further operative to generate a second duty cycle larger than the first duty cycle.

12. The converter of claim 1, wherein the converter is a component of a portable consumer electronics apparatus.

13. The converter of claim 1, wherein the converter is implemented as an integrated circuit.

14. A power converter circuit, comprising:
   a controllable switching circuit coupled between an output node and a reference node and configured to be coupled to an inductor;

a driver circuit configured to selectively actuate the controllable switching circuit; and control circuitry comprising:
- a window comparator circuit configured to compare an output voltage at the output node to a plurality of reference voltages defining windows and generate: a first indication if the output voltage is within a first window, a second indication if the output voltage is outside the first window but within a second window that is larger than the first window, and a third indication if the output voltage is outside the second window;
- an error circuit configured to determine an error between a set current level and a sensed inductor current level, the control circuitry driving operation of the driver circuit in response to said error; and
- a controller operative responsive to the first, second and third indications to generate the set current level as a function of an adaptive value, wherein the adaptive value has a first level in response to the first indication, a second level greater than the first level in response to the second indication and a third level greater than the second level in response to the third indication;
- wherein the adaptive value comprises a proportional part and an integrating part each including first, second and third levels, and wherein the set-current level is dependent on a combination of both the proportional part and the integrating part.

15. The circuit of claim 14, wherein the controller is further operative to generate the set current level as a function of a slope compensation signal, the set current level comprising a summation of the slope compensation signal and the adaptive value.

16. The circuit of claim 15, wherein the slope compensation signal is an adaptive slope compensation signal generated as a function of the output voltage.

17. The circuit of claim 14, wherein third levels for each of the proportional part and the integrating part are at least two times larger than the second levels for the corresponding proportional and integrating parts.

18. The circuit of claim 14, wherein the second level of the integrating part comprises:
- an initial second level used first in response to the second indication immediately following the first indication in time; and
- another second level, which is higher than the initial second level, that is used next after expiration of a time delay.

19. The circuit of claim 18, wherein the second level of the integrating part further comprises a further second level, which is higher than both the initial second level and another second level, used in response to the second indication immediately following the third indication in time.

20. The circuit of claim 18, wherein said initial second level is present during a single switching period of the power converter circuit.

21. The circuit of claim 14, wherein the circuit is a component of a portable consumer electronics apparatus.

22. The circuit of claim 14, wherein the circuit is implemented as an integrated circuit.

* * * * *